United States Patent
Laluet

(10) Patent No.: US 10,625,663 B2
(45) Date of Patent: *Apr. 21, 2020

(54) LAMINATED VEHICLE WINDSHIELD WITH INTERNAL LUMINOUS SIGN(S)

(71) Applicant: SAINT-GOBAIN GLASS FRANCE, Courbevoie (FR)

(72) Inventor: Jean-Yves Laluet, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 121 days.

This patent is subject to a terminal disclaimer.

(21) Appl. No.: 16/062,967

(22) PCT Filed: Dec. 13, 2016

(86) PCT No.: PCT/FR2016/053369
§ 371 (c)(1),
(2) Date: Jun. 15, 2018

(87) PCT Pub. No.: WO2017/103428
PCT Pub. Date: Jun. 22, 2017

(65) Prior Publication Data
US 2019/0001870 A1    Jan. 3, 2019

(30) Foreign Application Priority Data
Dec. 16, 2015 (FR) .................................. 15 62533

(51) Int. Cl.
| | |
|---|---|
| *B60Q 1/26* | (2006.01) |
| *B32B 17/10* | (2006.01) |
| *B60K 35/00* | (2006.01) |
| *B60Q 3/208* | (2017.01) |
| *B60Q 3/18* | (2017.01) |

(Continued)

(52) U.S. Cl.
CPC ........ *B60Q 1/268* (2013.01); *B32B 17/10018* (2013.01); *B32B 17/10036* (2013.01); *B32B 17/1077* (2013.01); *B32B 17/10174* (2013.01); *B32B 17/10339* (2013.01); *B32B 17/10348* (2013.01); *B32B 17/10541* (2013.01); *B32B 17/10761* (2013.01); *B32B 17/10788* (2013.01); *B60K 35/00* (2013.01); *B60Q 1/2696* (2013.01); *B60Q 3/14* (2017.02); *B60Q 3/18* (2017.02);
(Continued)

(58) Field of Classification Search
CPC .. B32B 17/10018–10788; B60K 35/00; B60Q 1/268; B60Q 1/2696; B60Q 3/14; B60Q 3/18; B60Q 3/208; G02B 27/0101
USPC ................................................. 362/503–504
See application file for complete search history.

(56) References Cited

U.S. PATENT DOCUMENTS

2015/0146286 A1    5/2015 Hagen et al.

FOREIGN PATENT DOCUMENTS

| | | |
|---|---|---|
| DE | 10 2004 016808 A1 | 10/2005 |
| EP | 2 719 531 A1 | 4/2014 |

(Continued)

OTHER PUBLICATIONS

International Search Report as issued in International Patent Application No. PCT/FR2016/053369, dated Mar. 21, 2017.

*Primary Examiner* — Jason M Han
(74) *Attorney, Agent, or Firm* — Pillsbury Winthrop Shaw Pittman LLP

(57) ABSTRACT

A laminated vehicle windshield containing internal luminous information includes a first glazing, a lamination (Continued)

interlayer, and a second glazing with a face bearing a first curved organic-light-emitting-diode device forming a first luminous sign.

20 Claims, 9 Drawing Sheets

(51) Int. Cl.
*B60Q 3/14* (2017.01)
*G02B 27/01* (2006.01)

(52) U.S. Cl.
CPC ......... *B60Q 3/208* (2017.02); *G02B 27/0101* (2013.01); *G02B 2027/0194* (2013.01)

(56) References Cited

FOREIGN PATENT DOCUMENTS

| | | |
|---|---|---|
| WO | WO 2004/025334 A2 | 3/2004 |
| WO | WO 2013/093351 A1 | 6/2013 |

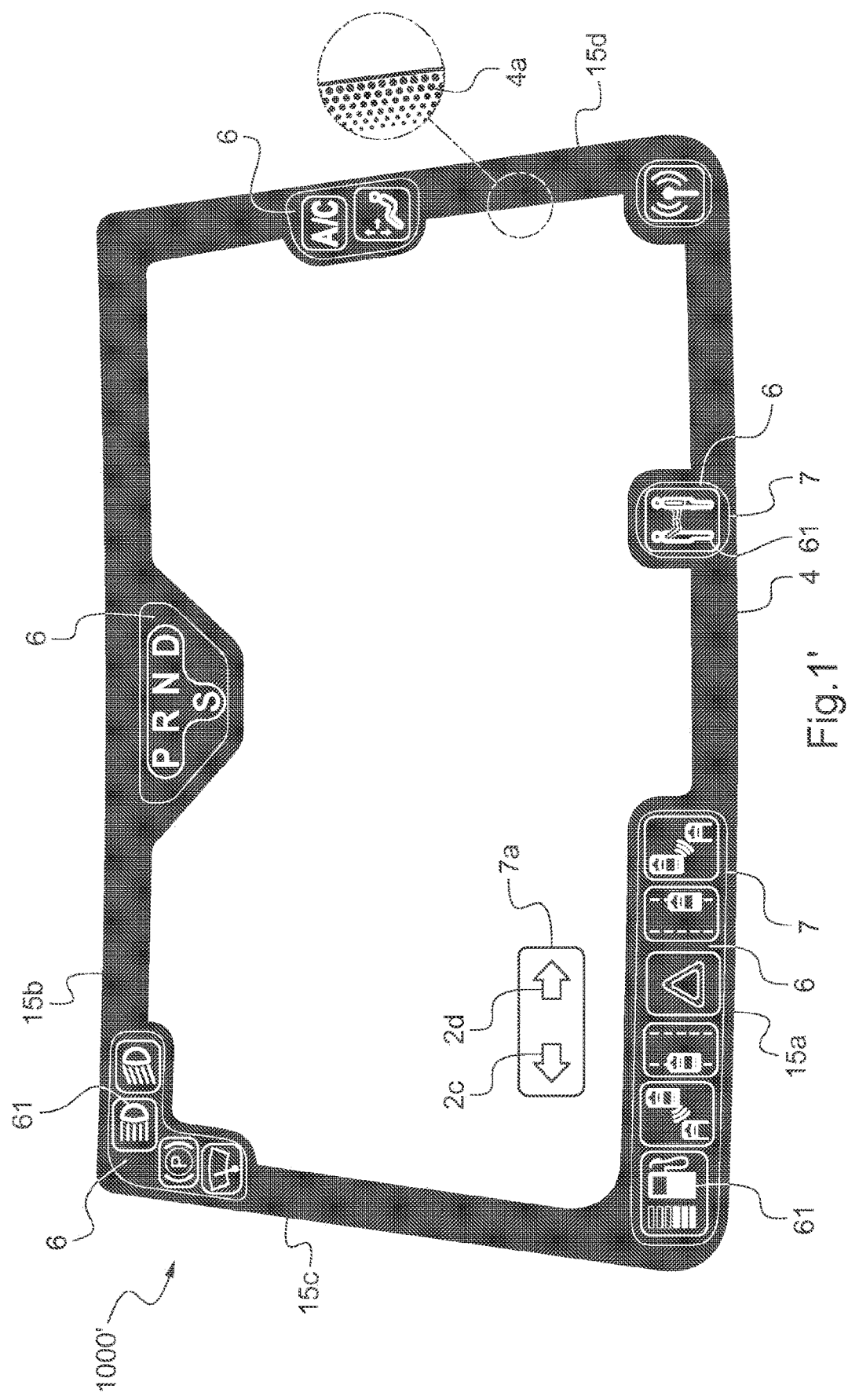

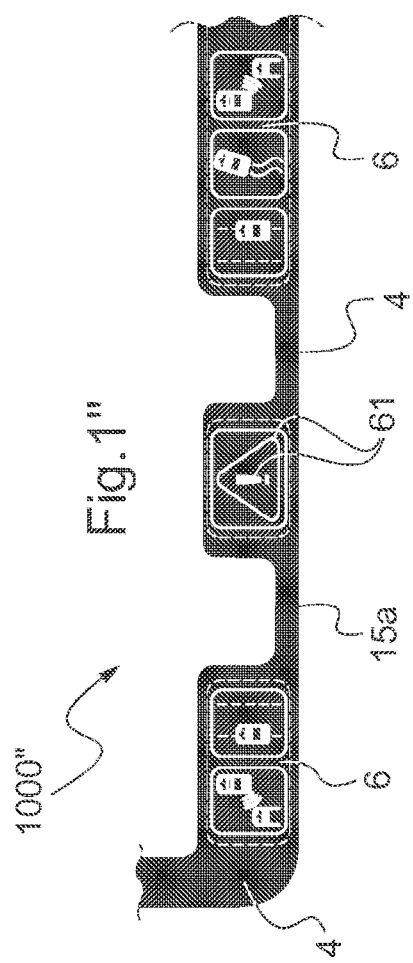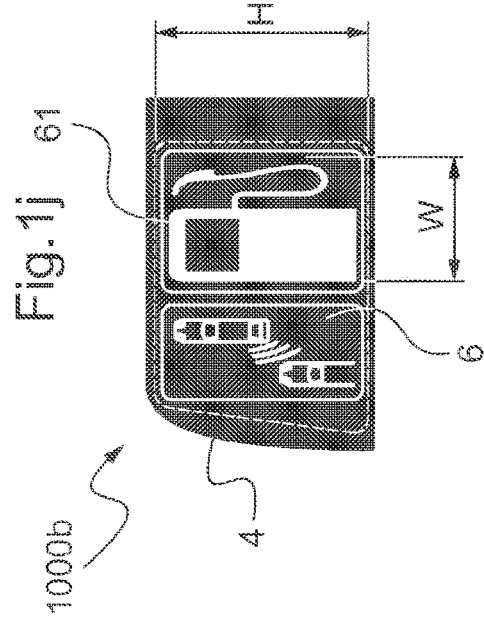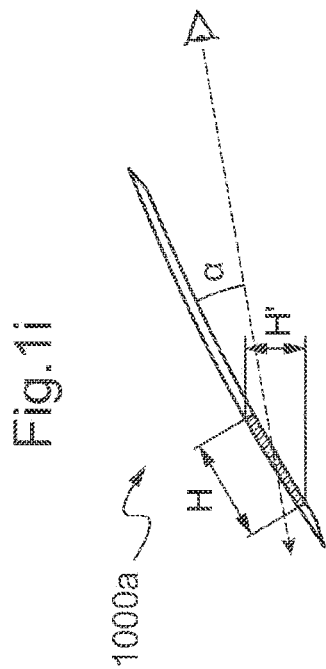

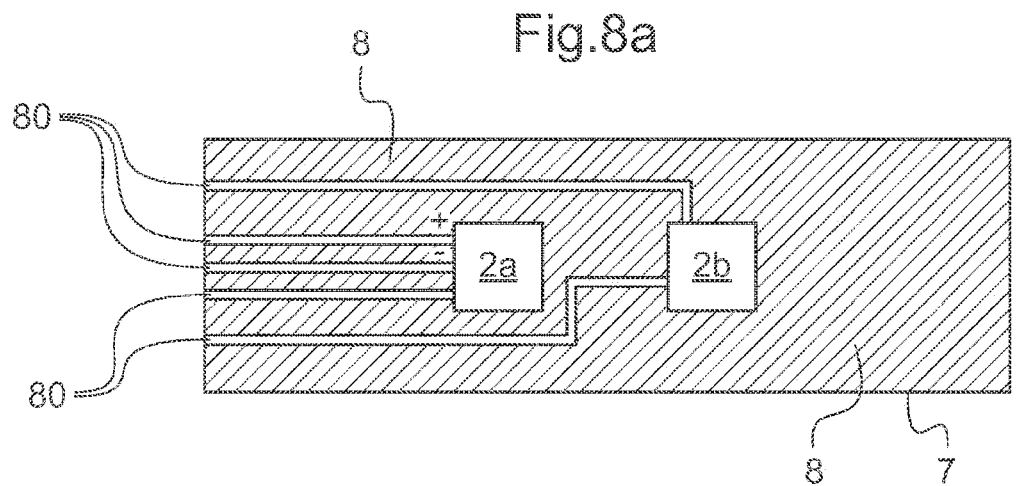
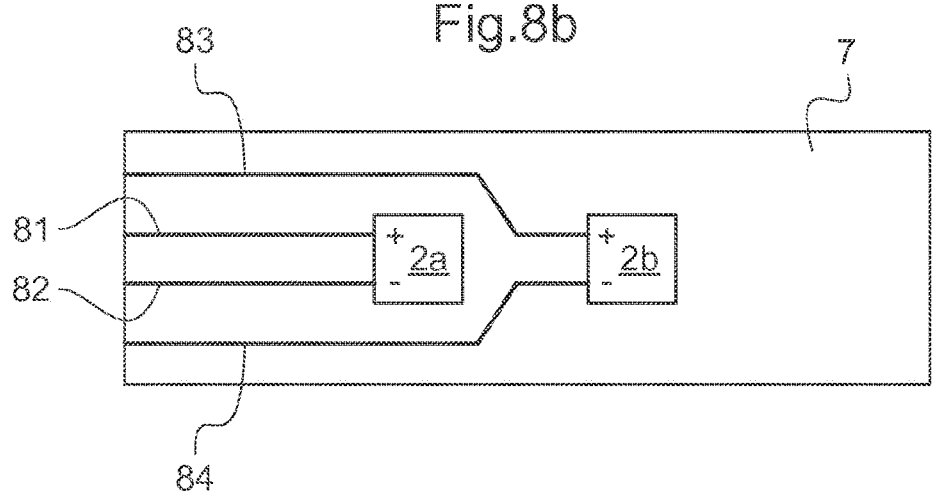
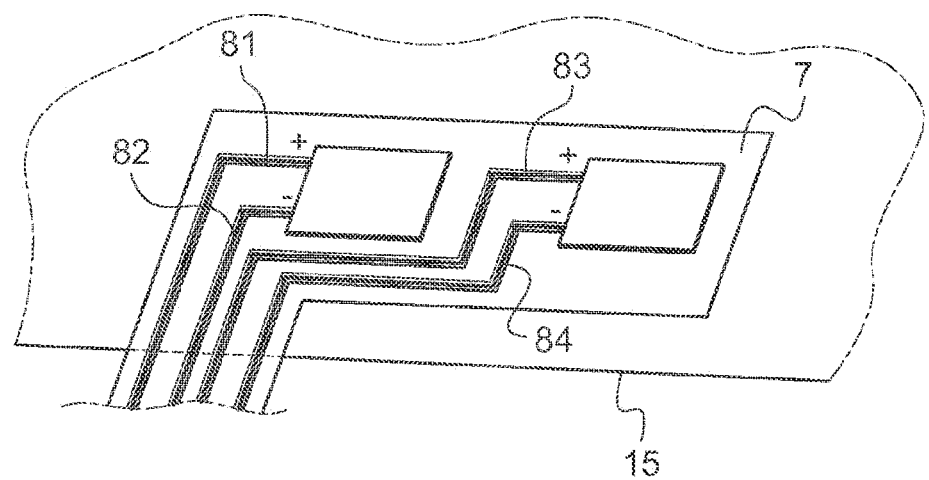

LAMINATED VEHICLE WINDSHIELD WITH INTERNAL LUMINOUS SIGN(S)

CROSS-REFERENCE TO RELATED APPLICATIONS

This application is the U.S. National Stage of PCT/FR2016/053369, filed Dec. 13, 2016, which in turn claims priority to French patent application number 1562533 filed Dec. 16, 2015. The content of these applications are incorporated herein by reference in their entireties.

The invention relates to the field of laminated vehicle windshields including an internal luminous sign and in particular luminous pictograms.

Windshields are increasingly equipped with systems for displaying visual information intended to assist with driving.

Patent application WO2013/093351 thus proposes a laminated windshield providing luminous information, including:

- a peripheral first masking layer for the exterior, which is opaque, made of a black enamel and placed in contact with the internal face of the first glazing, which is outermost;
- a peripheral second masking layer for the interior, which is opaque, made of a black enamel and placed in contact with the internal face of the second glazing, which is innermost, this masking layer comprising apertures forming pictograms;
- a uniform layer of a material doped with luminescent species chosen for their ability to absorb light radiation produced by a source generating radiation in the UV domain, such as an array of light-emitting diodes, and to reemit light radiation in the visible domain, said uniform luminescent layer being placed in the glazing, between the interior and exterior masking layers.

Admittedly, this proposed solution allows the information to be displayed in an edge zone of the windshield without the need for coherent exciting light sources of high power or that are complex because equipped with systems for controlling the direction of the beam.

However, the use of a UV source is a risk from the point of view of eye safety and makes the device complicated. Lastly, the luminescent particles are sensitive to heat and to bleaching. Thus, at the present time this technology is still not mature.

The aim of the present invention is to provide a laminated vehicle windshield containing internal luminous information and allowing all of the aforementioned problems to be addressed, while controlling its cost.

More precisely, the present invention relates to a laminated vehicle windshield (preferably for a road vehicle or even a rail vehicle) including one or more internal luminous signs, comprising:

- a first curved glazing that is preferably made of mineral glass and optionally tinted, in particular grey or green, with a first main face called F1, which face is intended to be exterior side of the vehicle and an opposite second main face called F2, said glazing being a thickness E1 of preferably (in particular for automobiles) at most 2.5 mm, and even of at most 2 mm—in particular 1.9 mm, 1.8 mm, 1.6 mm and 1.4 mm—or even of at most 1.3 mm or of at most 1 mm;
- a second curved (just like the first glazing) glazing that is preferably made of mineral glass, with a third main face called F3 and an opposite fourth main face called F4, which face is in particular intended to be interior side of the vehicle, the thickness E'1 preferably being smaller than E1 (in particular for automobiles), and even of at most 2.2 mm, of at most 2 mm—in particular 1.9 mm, 1.8 mm, 1.6 mm and 1.4 mm—or even of at most 1.3 mm or of at most 1 mm, the total thickness of the glazings E1+E'1 preferably being strictly smaller than 4 mm and even than 3.7 mm, at least one—and better still both—of the first and second glazings being made of mineral glass, the other optionally being made of organic glass i.e. of a material such as a polycarbonate, said first and second glazings being connected together via the faces F2 and F3 by a lamination interlayer made of (clear or extra-clear) thermoformable and preferably thermoplastic polymeric material located face F2 side and of (total) thickness E3 of at most 2.2 mm and better still of at most 2 mm, of at most 1.5 mm or even of at most 1 mm, said interlayer being made up of 1, 2 or 3 sheets and in particular being set back from the edge face of the second glazing (by at most 5 mm or even at most 2 mm or at most 1 mm) and even set back from the edge face of the first glazing (by at most 5 mm or even at most 2 mm or at most 1 mm), said interlayer including a first bonding main face face F2 side and a second bonding main face face F3 side;

preferably:
  - a first peripheral layer called the interior masking layer made of opaque material, which is between the second bonding face and the face F3 and in particular along a border of the face F3—in particular (directly) on the face F3 or even (directly) on the second bonding face—or which is on the face F4 and in particular along a border of the face F4—in particular being (directly) on the face F4 or even (directly) on the second bonding face;
  - and/or a second peripheral layer called the exterior masking layer made of opaque material, which layer is between the first bonding face and the face F2 and in particular facing the interior masking layer—and which is therefore along a border of the face F2—or even on F1; and
- a first light source for a first sign.

Furthermore, the first light source includes a first curved (because flexible and soft) organic-light-emitting-diode device called an OLED device, associated with face F4 and F4 side, on the periphery in particular above the zone of the interior and/or exterior masking layer or in the vision area, preferably in proximity to or even at the border of the interior and/or exterior masking layer zone.

The first OLED device is able to emit a first radiation in the visible spectrum.

The OLED device is behind a front, so-called protection element 7, preferably dielectric and transparent (at least in the emitting zone of the OLED device or devices), further away from the second glazing than the first OLED device, preferably a curved film (or, alternatively although less preferably—in the case of the first top-emitting OLED device, via the top electrode—a protection layer like a coating or a resin in particular in the interior and/or exterior masking zone, a coating optionally common to several OLEDs).

Using an OLED device rather than a UV source is safer. Furthermore, mounting is simple. OLED technology, which is reliable, allows a good lighting performance (brightness, color rendering, stability) to be obtained without glare and is of small thickness for a better visual effect. The flexibility of the flexible OLED allows the curvature of the glazings to be closely followed.

The first OLED device preferably comprises a first curved substrate bearing a bottom electrode (closest to the substrate), a first organic light-emitting system, and a so-called top electrode (furthest away from the substrate). The first OLED device is of preferably subcentimeter-sized thickness E2 and even at most 0.5 mm thick and better still at most 0.35 mm thick or at most 0.2 mm thick.

The first OLED device may preferably be bottom-emitting (emission through its substrate) so that the substrate is on the same side as the bottom face of the protective top element, against or adhesively bonded and/or held by solder bumps.

The first sign can be above the zone of the interior and/or exterior masking layer or in the vision area in proximity to, for example at less than 20, 10 cm, or less than 5 cm or even at the border of the interior and/or exterior masking layer zone: the border being a solid layer or made up of discontinuous patterns as indicated subsequently) above all to mask the arrival of the electrical tracks.

Preferably, the first sign above the interior and/or exterior masking layer leaves the border decorative patterns (circles, etc.) visible.

In the present application, the term "sign" should be understood to mean an iconic and/or linguistic signifier, i.e. one using symbols (numbers, pictograms, logos, symbolic colors, etc.) and/or a letter or words.

The invention is particularly suitable for a windshield of rectangular shape defined by its lateral and longitudinal edges and having an optional opaque peripheral border, such as one made of enamel, on face F2 and on face F3 or on F2 and F4.

In an advantageous configuration, when the first OLED device and even a second OLED device forming a second sign is above the interior and/or exterior masking layer zone, the front protection element is a film, curved, bearing, on its bottom or top main face, a so-called top masking layer, of opaque material, with a first so-called passage discontinuity to leave the first sign visible and even a second so-called passage discontinuity to leave the second sign visible.

The top masking layer may be matte or glossy, black, white or colored. Preferably, the top masking layer is the same color as the interior and/or exterior masking layer. Or intentionally a distinct color is chosen to create a contrast (color function of the vehicle covering etc.).

It is preferable to use a protective top element that is a film and common to a plurality of OLEDs rather than a protective varnish or film that is individual to each OLED light emission side.

Preferably, the total thickness between the face F4 and the top face of the protective element is at most 6 mm and even at most 2 mm and at most 1 mm and even submillimeter-sized.

The one or more OLED devices are sufficiently thin for the (common) protective top element to be fixed, in particular adhesively bonded via a double-sided adhesive to the face F4 (or to a bottom film) without the need for significant embossment. Preferably, the one or more OLED devices do not form an embossment to the eye or to the touch.

In a first preferred embodiment, the windshield comprises the first OLED device and/or a second OLED device forming a second sign in the vision area, the electrical connections are (quasi) invisible or transparent in particular in front of or behind the first OLED device, borne by a curved transparent film such as the top protection element or a bottom film.

Preferably, the sign-forming OLED device in the vision area is:

- in the bottom half of the bottom quadrant along the bottom longitudinal edge
- or even in the top half of the top quadrant on the driver side or passenger side along the top longitudinal edge
- in the left half of the left quadrant along the left lateral edge
- in the right half of the right quadrant along the right lateral edge.

In the vision area zone, in proximity to the border of the top masking layer, it is possible to place a system comprising optional transparent bottom film/OLEDs/transparent top protection element. The electrical power supply conductors are chosen to be made of transparent material or of more opaque material (metallic etc.) of a width that is sufficiently thin (for example at most 1 or 0.8 mm or even 0.5 mm or even at least 0.1 mm)—wires and/or tracks—so as to be (quasi) invisible, and a transparent bond is also chosen. It is then preferable to have a light transmission (in particular outside of the OLED zone) of at least 70%.

The transparent top protection element (with transparent connections) can extend above the interior and/or exterior masking zone and protect one or other of the OLED signs. The same applies for the optional bottom film, etc.

Preferably, the protective top element is a curved film which extends beyond one or more edges of the first OLED device and a second OLED device adjacent to the first OLED device forms a second sign, made up of one or more symbols and/or one or more letters, which side is adjacent to the first sign, and is behind the protective top element, the bottom main face of the protective top element being in particular adhesively bonded to face F4 by a glue or an in particular tinted double-sided adhesive (microsucker), in particular with holes for housing the first and second OLED devices.

Preferably, a second curved organic light-emitting diode device called an OLED device is associated with face F4 and face F4 side, said second OLED device being distinct from the first OLED device and forming a second sign with symbol(s) and/or letter(s), adjacent to the first sign, in particular spaced apart by at least 1 cm and, even better, by at least 2 cm from the first sign, and preferably the first and second OLED devices are on a common support in the form of a curved film of preferably subcentimetric thickness, which is:

- arranged top side and therefore light emission side and preferably corresponds to the protective top element,
- or is a film called the bottom film arranged bottom side and therefore the side opposite to the light emission side, on face F4 and in particular with a bottom main face adhesively bonded to face F4.

In a preferred configuration, the top protection element via its bottom face bears electrical conductors powering the first OLED device and the second OLED device, the top protection element optionally extending beyond the rim of the glazings, in particular is L-shaped with a part extending beyond the rim of the glazings, or the bottom film via its top face bears electrical conductors powering the first OLED device and the second OLED device, the bottom film optionally extending beyond a rim of the glazings, in particular is L-shaped with a part extending beyond the rim of the glazings.

The protective top element may bear on its bottom face electrical conductors, in particular an electrically conductive layer with one or more electrically insulating tracks or conductive tracks. The bottom film may bear, on its top face, electrical conductors, in particular an electrically conductive layer (which is optionally transparent, a TCO, a metal, a full coat or a grid for transparency, a stack of thin films, etc.) with one or more electrically insulating tracks or conductive tracks.

The first OLED device may be bottom-emitting (emission through its substrate) and covered face F4 side with an optionally dielectric protective layer that is an (epoxy, etc.) varnish or a resin. This resin may extend to the electrical conductors and to the OLED devices (on the bottom face of the protective top element).

In one preferred embodiment, the protective top element via its bottom face bears electrical conductors that supply the first OLED device and the second OLED device with power, the bottom face bears a double-sided adhesive or even a glue (or microsuckers) on the electrical conductors with one of the apertures leaving free one or more zones of the electrical conductors for the electrical contacts, which in particular are formed by one or more solder bumps or blobs of conductive glue, to the first OLED device and the second OLED device. The protective top element possibly extends beyond an edge face of the glazings and in particular is L-shaped with a portion extending beyond the edge face of the glazings.

Preferably, the protective top element is chosen from a polymeric film in particular made of a PET, a polyimide, a polyester, polyvinyl chloride (PVC), polycarbonate, acrylate, a PEN, PEEK or a glass and/or a bottom film, between the face F4 and the first OLED device is chosen from a polymeric film in particular made of a PET, a polyester, a polyimide, a polyvinyl chloride (PVC), a polycarbonate, an acrylate, a PEN, PEEK.

It may be preferable for both the bottom film and a protective top element to be polymer (or made of glass).

By way of example of transparent (printable with ink, etc.) adhesive film for the protective top element and/or the bottom film (which may be opaque, or better transparent if in the vision area), mention may be made of the films from the company FILMOLUX such as:

Solvoprint easy dot 100 clear (made of PVC of 100 μm and having a microperforated adhesive face);
—Filmolux easy dot clear;
Window-grip ultraclear (made of PET of 120 μm);
Electrostatic PVC; and
Filmolux Tako UV (transparent polyester of 178 μm) or white (with verso with microsuckers).

The bonding on the face F4 of the bottom film or of the top protection element and/even the (local) bonding on the face F4 (without bottom film) of the first OLED device can be permanent or even temporary (non-destructive removal, etc.): removable tape, heat-sensitive glue, etc.). A removable glue, for example acrylate, can be unstuck without leaving residues.

A glue or adhesive coat (face F4, top face of the bottom film, bottom face of the protective top element) may be microperforated for easy bubble-free positioning.

A non-permanent bond or double-sided adhesive makes it possible to replace elements (OLED etc.) in the context of maintenance or the addition of new functionalities and/or OLED signs.

The bottom film can have a contact by electrostatic adhesion with the face F4 (with or without the bottom masking layer). This type of contact is preferred between smooth surfaces.

The adhesion (of the top protection element and/or of the bottom film) can also be made by microsuckers.

The bottom film may have a masking layer (replacing or in addition to the interior and/or exterior masking layer) in particular facing the one or more OLED devices.

In a second preferred embodiment, the windshield comprises a second organic light-emitting diode device called curved OLED (2b), is on the face F4, which second OLED device is distinct from the first OLED device forming a second sign made up of one or more symbols and/or one or more letters, which sign is adjacent to the first sign and in particular spaced apart by at least 1 cm and better still at least 2 cm from the first sign and in that the first and second OLED devices are between:

a bottom element, which is therefore the side opposite the light emission side, in particular of preferably subcentimeter-sized thickness, curved and adhesively bonded to face F4, chosen from a double-sided adhesive and a film bearing first electrical conductors on a top face (51) that is on the same side as the first and second OLED devices;

and the protective top element that is a curved film optionally bearing on its bottom face second electrical conductors.

In particular in this second embodiment, the first conductors are for supplying the first and second OLED devices with power and the second conductors form a touch button of the first OLED device, in particular a capacitive element, in particular a capacitive element (PET with electrical conductors, etc.), in particular the first electrical conductors facing the second conductors that are electrically insulated by a dielectric or being offset from the second conductors.

In particular, the first OLED device is mounted on face F4 directly or via a carrier that is common to a second OLED device that is adjacent to the first OLED device forming a second sign made up of one or more symbols and/or one or more letters, which sign is adjacent to the first sign, and, preferably, the face F4, which is optionally coated with the interior masking layer or the common carrier bears electrical conductors that supply the first OLED device and the second OLED device with electrical power, the common carrier possibly extending beyond an edge face of the glazings and being adhesively bonded via its bottom face to face F4.

The electrical conductors of the first OLED device, and of a second OLED device on a flexible film are preferably protected by a varnish or a resin or even all thereof is coated in a protective resin that is at most 0.5 mm in thickness, all thereof being adhesively bonded to the face F4 directly or via a bottom film and to the protective top element.

Preferably, the first sign (OLED) is inscribed in a rectangle of centimeter-sized vertical dimension or height H (its horizontal dimension being called width W) and such as to define an angle $\alpha$ between the windshield and the gaze axis of the driver (or passenger), the first sign (OLED) is characterized by a vertical dimension called the apparent height H' and H is set by the formula $H=H'/\sin(\alpha)$.

For example, for a sign (OLED) of 2 cm (targeted) apparent height H' and for an angle of 25°, H is 4.7 cm. The correction by anamorphosis may therefore be large.

For example, the first sign (OLED) may be inscribed in a square or a rectangle of H (or better still H') and of W (or better still W') of 1 to 10 cm and better still from 2 to 5 cm. To a lesser extent, it is also possible to seek to compensate the effect of perspective by widening the base of the first sign by a factor $(1+H'/(d \tan(\alpha)))$ with respect to its top where d is the distance between the driver (or passenger) and the first sign.

The first sign and even a second sign or a plurality of signs, each formed by an OLED device, may be located:

along the lower longitudinal edge (in mounted position), in particular driver side, above all when the signs are driving aids (pictograms, etc.) requiring a rapid reaction from the driver;

alternatively or cumulatively, along the upper longitudinal edge (in mounted position) in particular when the pictograms are driving aids or information on the state of the vehicle;

alternatively or cumulatively, along the driver side lateral edge (in mounted position) in particular when the pictograms are driving aids or information on the state of the vehicle;

alternatively or cumulatively, along the passenger side lateral edge (in mounted position) in particular for pictograms concerning the passenger.

The first sign is chosen for example from:

a driving aid preferably on the lower longitudinal edge;

a status indicator indicating an operating state of the automobile, preferably on the lower longitudinal edge, upper longitudinal edge or driver side lateral edge;

information on the external environment: weather, etc.; and an indicator indicating connectivity to a communications network, in particular on the front passenger side lateral edge.

The first sign may be above in a first unapertured zone of the interior masking layer. It may be desired to locally increase the width of the unapertured zone so that the driver (or copilot) is better able to see the first sign (without having to lower his gaze too much). Furthermore, the interior masking layer may be an in particular longitudinal or lateral driver (or passenger) side strip (made of enamel, on face F3 or F4) of width L0 of at most 2, 5, 10, 20 cm or 30 cm, and in the zone of the first sign of width L1>L0.

The first sign may be in the vision area or in the unapertured zone, and in proximity to a discontinuous (decorative) interior-masking zone adjacent to the first unapertured zone, in particular taking the form of a set of decorative patterns (that will often be subcentimeter-sized and spaced apart by 0.01 to 2 cm), in particular made of enamel (the same enamel as the unapertured zone). For example, the patterns are of decreasing size in the direction of the middle of the vision area and/or increasingly spaced in the direction of the middle of the vision area.

The interior masking layer may be a strip along one edge of the windshield.

The first OLED device may be able to emit, depending on control signs, a first emission, such as a red, green, orange or white emission, at the time t1 and a second distinct emission, such as a red, green, orange or white emission, at the time t2.

The windshield may include a color filter as a colored filtering layer on the first OLED device, which in particular is white-emitting, or on the top or bottom face of the protection element, in particular in the passage opening of the optional top masking layer.

It is also possible to employ it with a color OLED in the case where its emission spectrum does not allow given color coordinates (such as set in a standard for example, or requested by the automobile manufacturer) to be obtained directly. For example, when the emission spectrum is too broad, the color filter then allows at least some thereof to be filtered out.

The color filter preferably includes a colored filtering layer on the first (bottom-emitting) OLED device or on the protective top element (top or bottom face).

It is possible to use various types of filter (having different make-ups and different modes of operation) that act on or modify in a chosen, characterized and reproducible way the light emission of the OLED device (specifically, their light transmission has a different spectral dispersion to that of the light emission of the OLED device). These filters may be colored transparent polymers, colored glasses, the coloration being achieved by deposition or in the bulk thereof, or may be layers deposited on the OLEDs, etc. as explained below.

As mentioned above, one or more absorption filters (this absorption in particular being controlled by inorganic or organic compounds added as appropriate to a matrix made of glass or made of plastic). This type of filter may for example be formed by depositing one or more organic or mineral pigments or dyes (optionally dissolved or dispersed in a medium, in particular such as a silicone, epoxy or acrylic resin, a UV-curable ink, or a mineral sol-gel matrix) on the surface of a transparent bearing element such as the common carrier (on its top face). This element may be a glazing material (a soda-lime glass, borosilicate glass, or plastic/polymer (pane of polyethylene terephthalate, in particular thermostablized polyethylene terephthalate, polycarbonate, acrylate, polyetheretherketone (PEEK), etc.)). Examples of these filters are in particular gelatin filters or the polymer color filters sold by Lee Filters or Rosco. The deposition may be carried out by screen printing, by inkjet or laser printing, by spray coating, by dip coating, by roll coating, etc. and is preferably carried out by screen printing or inkjet printing, in particular on a glass and/or the OLED device, in particular and advantageously by inkjet printing.

It will be noted that the colored substances (in particular dyes or pigments) used to produce the aforementioned filters preferably are heat resistant. For example, optionally polychlorinated copper phthalocyanine pigments may advantageously be used, these pigments being used in mixture and dispersed in a resin, in particular a cross-linkable polysiloxane resin, the mixture for example (and advantageously) being applied in particular by screen printing. In the case of inkjet printing, the inks used may in particular be UV-curable inks that are stable with temperature and in light, such as for example the Anapurna M inks sold by Agfa.

The absorption filter advantageously allows the chosen effect or color to be obtained whatever the angle of incidence of the observation.

In another embodiment, one or more filters acting by reflection of light (this reflection in particular being controlled by the interference that occurs within a stack of thin layers made of various materials, a thin layer being a layer the thickness of which is smaller than the wavelength of the light), in particular dichroic filters, filters based on semireflective interference stacks (of layers), etc. are used. Such filters are for example produced by (vacuum) physical vapor deposition (PVD) (sputtering, magnetron sputtering, evaporation) or chemical vapor deposition (CVD) of high- and low-refractive-index layers in alternation, the substrate on which the deposition is carried out possibly being a glazing material or a polymer.

The reflection filter allows the chosen effect or color to be obtained on the gaze axis of the driver, the perceived effect or color possibly however being different at another incidence.

The first OLED device preferably comprises in this order:

a substrate (which is preferably dielectric and in particular transparent: plastic or glass film);

optionally one or more functional layers:

barrier layer to moisture (if the substrate is plastic) or
barrier layer to alkali metals (if the substrate is
glass),
and/or light-extracting layer: scattering layer, for
example enamel or another mineral (sol-gel etc.) or
organic binder with scattering particles if glazing
substrate or organic (resin) or mineral (sol-gel)
binder with scattering particles if plastic substrate,
a preferably transparent lower electrode (anode);
a first organic light-emitting system (plurality of emitters
of various colors may be stacked);
and a preferably reflective upper electrode that is in
particular metal (silver, aluminum, etc.); and optionally an
overlayer such as an encapsulation layer (deposit or film that
is for example polymeric, for example adhesively bonded to
the upper electrode, etc.).

The overlayer may be adhesively bonded or against the face F4 (F4 with or without masking layer).

If a second OLED device is used associated with face F4, it may have the same structure and in particular may comprise:
a substrate (which is preferably dielectric and in particular transparent: glass or plastic film) that is either the first substrate (common substrate) or a distinct second (adjacent) substrate;
optionally one or more functional layers:
barrier layer to moisture (if the substrate is plastic) or
barrier layer to alkali metals (if the substrate is glass),
and/or light-extracting layer: scattering layer, for example enamel or another mineral (sol-gel etc.) or organic binder with scattering particles if glazing substrate or organic (resin) or mineral (sol-gel) binder with scattering particles if plastic substrate,
a preferably transparent lower electrode (anode);
a second organic light-emitting system (a plurality of emitters of various colors may be stacked), of identical or distinct color to the first system;
a preferably reflective upper electrode; and
optionally an overlayer such as an encapsulation layer (deposit or film that is for example polymeric, for example adhesively bonded to the upper electrode, etc.).

The first and second OLED devices may in particular be adjacent and on a common carrier (plastic film, in particular for protecting and/or bearing electrical conductors etc.) that is substrate(s) side or upper electrode side (on the electrodes or on the overlayer).

A plurality of types of OLED are known:
bottom-emitting or in other words substrate-emitting OLEDs (emitting through a transparent substrate), the lower electrode being transparent and the upper electrode reflective;
top-emitting OLEDs (output through the upper electrode), the lower electrode being reflective and the upper electrode transparent; and
bottom- and top-emitting OLEDs using transparent or semitransparent electrodes.

Preferably a bottom-emitting first OLED device is used i.e. one that emits from the bottom and therefore the substrate is the same side as the protective top element.

Each (preferably lower) transparent electrode may be a metal grid, for example made of silver (of suitable width), or a transparent electrically conductive layer such as a layer of a transparent conductive oxide (TCO) or a stack of thin layers with at least one (thin) metal layer, in particular of silver, between two dielectric layers for example of oxides and/or nitrides of one or more metals (Sn, Zn, etc.) or silicon.

The first OLED device may have one or more technical edges (non-emitting zones) for the supply of electrical power on the periphery of the emitting zone, typically consisting of one or more strips in particular flanking the emitting zone. This technical edge may be a current-distributing zone. A technical edge may be of width W2 of at most 2 cm and preferably of at most 1 cm or even of at most 6 mm or 5 mm.

It may be desirable for the first sign and the adjacent second and other signs to be aligned in a single row rather than superposed in the top masking zone.

Preferably, the top masking layer (preferably made of enamel) masks the one or more technical edges of the first OLED device and even masks: any electrical connector (which would otherwise be seen) that is present between the face F4 and the bottom face of the top element and connected to the first OLED device i.e. a connector such as a cable, one or more wires, a conductive film, etc.

Preferably, the (width of the) first OLED device extends beyond the passage aperture for example by at least 5 mm and even at least 1 cm in order for the light-emitting zone of the OLED to easily face the passage aperture.

In a given peripheral zone it may be desired for there to be a plurality of luminous signs (pictograms, etc.) side-by-side (aligned for example or in a corner of the windshield, etc.). The general shape of the protective top element and/or the bottom film may be that of a rectangular strip along the first (longitudinal or lateral) edge, which is optionally L-shaped (for the corners) or L-shaped and therefore with a dog-legged portion for electrical connections jutting out from the edge face of the glazings.

The protective top element and/or the bottom film advantageously serve:
to handle and assemble more easily a set of premounted OLEDs;
to more easily produce the electrical connections;
as a mechanical reinforcement.

The protective top element or the bottom film may bear one or more electronic components including a first microcontroller (driver) addressing the first OLED device and regulating the electrical power supply (preferably the current) of the first OLED device and even one or more second electronic components including a second microcontroller addressing the second OLED device and regulating the electrical power supply (preferably the current) of the second OLED device.

Each microcontroller identifies in the control sign whether a command is intended for its OLED and adjusts the level (the magnitude of the current for example) accordingly.

For each OLED on the common carrier, there are preferably two electrical conductors for the control sign decoded by the dedicated microcontroller and two electrical conductors for the power sign connected to the microcontroller.

Provision may be made for means for modulating the power of the OLEDs between at least two configurations: a configuration for nighttime driving, in which the power of the first OLED device is adjusted so that the luminance of the first sign is typically comprised between about 30 and about 100 $Cd/m^2$ and a configuration for daytime driving, in which the power of the first OLED device is adjusted so that the first sign is typically comprised between about 200 and about 2000 $Cd/m^2$. During the day, the luminance may possibly also be adjusted depending on exterior lighting conditions, in particular with a sensor for sensing natural light in the windshield or elsewhere in the vehicle: if it is very sunny the OLED is made to emit strongly and if it is cloudy less strongly in order not to dazzle.

The thermoformable material from which said interlayer is made is chosen from the group containing the polyvinyl butyrals (PVBs) such as RC41 from Solutia or Eastman, the plasticized polyvinyl chlorides (PVCs), polyurethane (PU) or the ethylene vinyl acetates (EVAs). Preferably, the thermoformable material is a polyvinyl butyral (PVB) that optionally has a wedge-shaped transverse cross section that decreases from the top of the laminated glazing to the bottom.

The lamination interlayer may have a wedge-shaped transverse cross section that decreases from the top of the laminated windshield to the bottom in particular to avoid double images in the case of an additional head-up display (HUD).

It may be desired to preserve the acoustic properties of the windshields. Thus, the lamination interlayer may comprise at least one what is called middle layer made of a viscoelastic plastic having vibro-acoustic damping properties and in particular based on polyvinyl butyral and plasticizer and the interlayer furthermore comprising two external layers made of standard PVB, the middle layer being between the two external layers. And even, to use a head-up display device of HUD type, optionally one or both of the outer layers has a wedge-shaped cross section that decreases from the top of the laminated glazing to the bottom, the layer of viscoelastic plastic material with the vibro-acoustic damping properties having a constant cross section from the top of the laminated glazing to the bottom.

The interior (exterior, respectively) masking layer may be a layer of black enamel, a layer of paint or an opaque ink preferably on the face F2 (F3 or F4, respectively) or on the lamination interlayer or even on an additional (PET etc.) .carrier film.

Advantageously, the exterior and interior masking layers are made of the same material (preferably of an enamel, in particular a black enamel) and on F2 and F3 or on F2 and F4.

The first glazing and likewise the second glazing may be parallelepipedal, with panes or main faces that are rectangular, square or even any other shape (round, oval, polygonal). It may be large in size, for example of area larger than 0.5 or 1 m$^2$.

The first and/or second glazing may (depending on the esthetic rendering or the desired optical effect) be a clear glass (light transmission $T_L$ higher than or equal to 90% for a thickness of 4 mm), for example a glass of standard soda-lime composition such as Planilux® from Saint-Gobain Glass, or an extra-clear glass ($T_L$ higher than or equal to 91.5% for a thickness of 4 mm), for example a soda-lime-silica glass with less than 0.05% Fe III or $Fe_2O_3$ such as the glass Diamant® from Saint-Gobain Glass, or the glass Optiwhite® from Pilkington or the glass B270® from Schott, or a glass of another composition described in document WO04/025334.

The glass of the first and/or second glazing may be neutral (no tint), or (slightly) tinted, in particular grey or green, such as the glass VENUS or TSA from Saint-Gobain Glass. The glass of the first and/or second glazing may have undergone a chemical or thermal treatment such as a toughening, annealing or tempering treatment (in particular to obtain a better strength) or be semi-tempered.

The light transmission $T_L$ may be measured according to standard ISO 9050:2003 using illuminant D65, and is the total transmission (in particular integrated over the domain of the visible and weighted by the curve of sensitivity of the human eye) taking into account both direct transmission and possible diffuse transmission, the measurement for example being carried out using a spectrophotometer equipped with an integrating sphere, the measurement at a given thickness then being converted if needs be to the reference thickness of 4 mm according to standard ISO 9050:2003.

For a windshield, the $T_L$ may preferably be at least 70% and even at least 75%.

In one embodiment, the first glazing is made of mineral glass and the second glazing is made of organic glass (such as PC, PMMA, cyclic-olefin copolymer (COC) or even polyethylene terephthalate (PET) optionally protected by a coating (on face F4).

The exterior glazing may include thin functional layers on either one of its faces F1 and F2 or indeed both thereof: mention may be made of a hydrophobic or self-cleaning photocatalytic layer on face F1 and of a layer or a stack of thin layers that reflect solar radiation on face F2 (and serving to form one or more capacitive sensors, an antenna, etc.).

In order to limit heating of the passenger compartment or to limit the use of air conditioning, one of the glazings at least (preferably the exterior glass) is tinted, and the laminated glazing may also include a layer that reflects or absorbs solar radiation, preferably on face F4 or on face F2 or F3, in particular:
   a layer of transparent electrically conductive oxide called a TCO layer (on face F4) or a stack of thin layers comprising at least one TCO layer;
   a stack of thin layers comprising at least one silver layer (on F2 or F3, the or each silver layer being deposited between dielectric layers.

It is possible to place both a (silver-containing) layer on face F2 and/or F3 and a TCO layer on F4.

The TCO layer (of a transparent electrically conductive oxide) is preferably a layer of fluorine-doped tin oxide ($SnO_2$:F) or a layer of indium tin oxide (ITO). For layers made of ITO, the thickness will generally be at least 40 nm, or even at least 50 nm and even at least 70 nm, and often at most 150 nm or at most 200 nm. For fluorine-doped tin oxide layers, the thickness will generally be at least 120 nm, or even at least 200 nm, and often at most 500 nm. For example, the low-emissivity layer comprises the following sequence: high-index sublayer/low-index sublayer/a TCO layer/optional dielectric overlayer. By way of example of low-emissivity layer (protected during a temper), the following may be chosen: high-index sublayer (<40 nm)/low-index sublayer (<30 nm)/an ITO layer/high-index overlayer (5-15 nm)/low-index barrier overlayer (<90 nm)/last layer (<10 nm). Mention may be made, by way of low-emissivity layer, of the layers described in patent US 2015/0146286, on face F4, in particular in examples 1 to 3.

The face F3 may therefore include a heating layer, which is preferably neutral in transmission, optionally under the interior masking layer on F3, which layer is surmounted by first and second current-distributing strips that are typically on the first and second longitudinal edges and that in particular are opaque and for example made of a silver-containing enamel.

Furthermore, the first sign, in particular when it is on a first longitudinal edge, may be set apart from an opaque first current-distributing strip of a heating layer on F3. The first current-distributing strip may be more central than the first sign.

The transparent electrically conductive layer on F4 may serve to supply the OLED with power.

An (optionally) transparent electrically conductive layer on F4 or F3 may serve as a touch button for the OLED.

The distance D between the (longitudinal) edge of the glazing and the base of the first sign OLED may be at least 5 cm, 8 cm, 10 cm. The distance D between the (longitudinal) edge of the glazing and the base of the first sign OLED may be at most 25 cm, and even at most 20 cm.

The invention and its advantages will be better understood on reading the following description of nonlimiting embodiments, which description is given below with reference to the following figures.

FIG. 1 shows a passenger compartment side front view of a first windshield comprising internal luminous signs according to the present invention.

FIG. 1' shows a passenger compartment side front view of a second windshield comprising internal luminous signs according to the present invention.

FIG. 1" shows a partial passenger compartment side front view of a third windshield comprising internal luminous signs according to the present invention.

FIG. 1$i$ is a side view that shows the inclination of a windshield with an internal luminous sign according to the invention and FIG. 1$j$ shows signs stretched in the vertical direction to compensate for the effect of the inclination.

FIG. 8$a$ shows a front view of a common carrier bearing two OLED devices forming luminous signs and bearing current-distributing conductors on the windshield.

FIG. 8$b$ shows a front view of a common carrier bearing two OLED devices forming luminous signs and bearing distributing conductors on the windshield.

FIG. 8$c$ shows a front view of a common carrier bearing two OLED devices forming luminous signs and bearing current-distributing conductors on the windshield.

Figure 1:
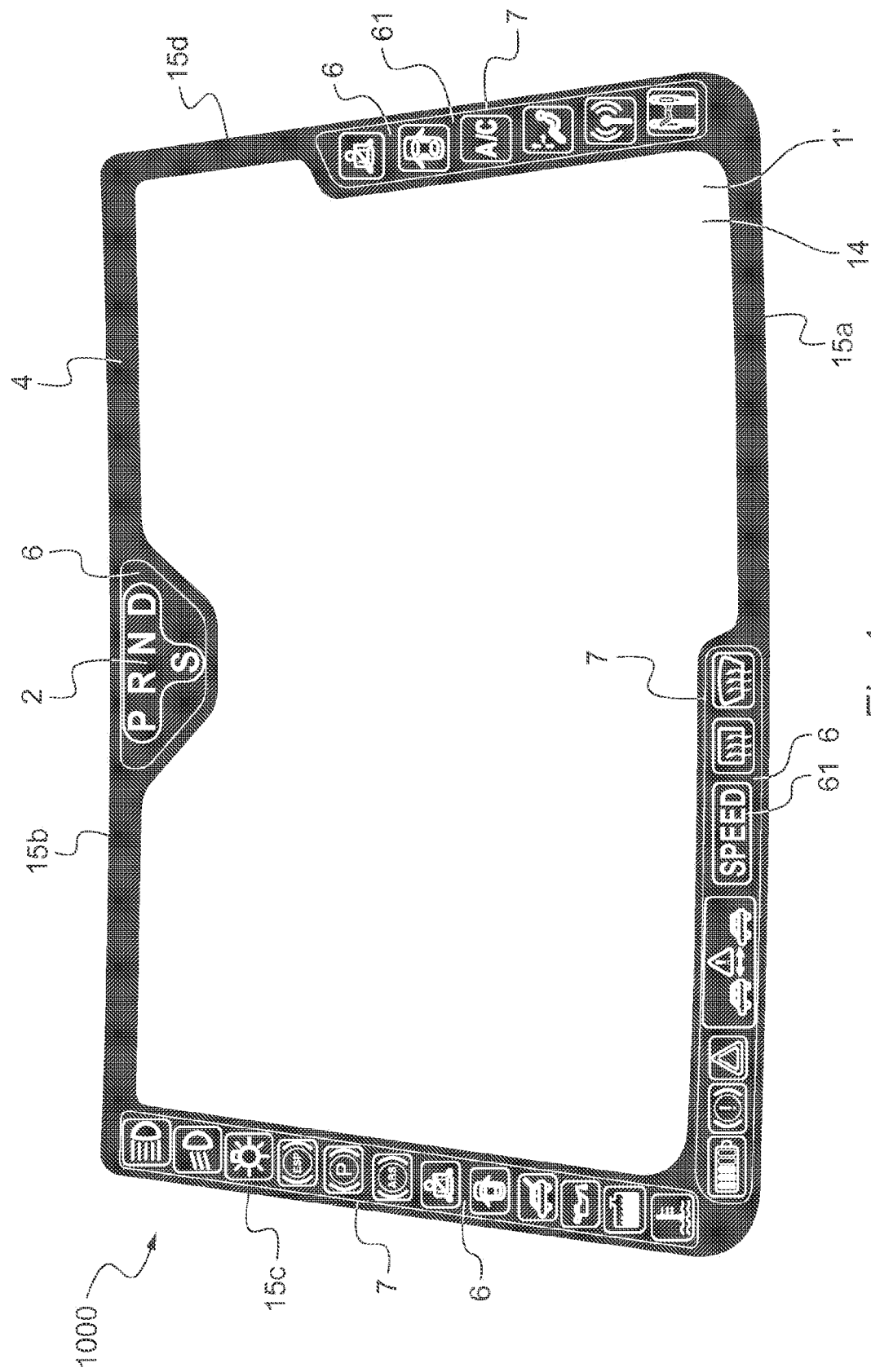

FIG. 1 shows a passenger compartment side front view of a windshield comprising internal luminous signs according to the present invention.

The windshield 1000 is laminated and includes a first curved external glazing with main faces F1 (the outermost face) and F2, a polymeric lamination interlayer made of a material such as a PVB, and a second curved internal glazing 1' with main faces F3 and F4 (the innermost face).

It is of a rectangular shape defined by its lateral edges 15$c$ and 15$d$ and longitudinal edges 15$a$ and 15$b$ and has an opaque peripheral border, that here is black, on face F2 and on face F3 or on F2 and F4 or even only on face F2, F3 or F4.

The interior masking layer 4 is opaque and may be made of a black enamel deposited on face 13 or F3 or face 14 or F4 of the internal glass 1', made of paint or even of an optically opaque ink deposited on the polymer interlayer, or of an added, tinted or painted, opaque polymer layer laminated between the interior glass and the interlayer.

This layer is deposited using any technique known to those skilled in the art, for example, nonlimitingly, using screen-printing techniques, inkjet-printing techniques or even rotogravure-, flexographic or offset-printing techniques.

Curved organic-light-emitting-diode devices called OLED devices, which are associated with face F4 on the periphery and face F4 side, are here above the zone of the interior and exterior masking layers 4, 4' (as a variant it is possible to have the layer 4 or the layer 4'). They are able to emit a first emission in the visible spectrum and form luminous signs.

Each OLED device is behind (against or fastened to) a top element called the protective top element 7 that is preferably dielectric and transparent, further from the second glazing then the OLED device, and that is a thin glass or polymeric transparent curved film. The top element called the protective top element bears, on its bottom main face 71 or top main face 72, one or more first discontinuities 61 in a layer called the top masking layer 6, forming passage apertures that leave the OLED signs visible.

A plurality of signs each of which is formed by a dedicated OLED device are located along the lower longitudinal edge 15$a$ (in mounted position) in particular driver side, above all when the signs are driving aids (requiring a rapid reaction from the driver. For example the OLED devices are behind (against or fastened to) the protective top element 7.

Mention may be made of:
  an indicator indicating excess speed ("SPEED" in letters) that lights up optionally red or optionally orange when the limit is almost reached;
  an anti-frontal-collision diagnostic that for example turns on if the vehicle is too close to the vehicle (automobile, motorcycle, etc.) in front i.e. not respecting the stopping distance;
  a hazard warning light that turns on in case of danger.

A plurality of signs each of which is formed by a dedicated OLED device are located along the upper longitudinal edge 15$b$ (in mounted position) in particular in the central position conventionally used for fastening the rear-view mirror, the OLED devices for example being behind (against or fastened to) the protective top element 7.

A plurality of signs each of which is formed by a dedicated OLED device are located along the left-hand lateral edge 15$c$ (in mounted position), the OLED devices for example being behind (against or fastened to) the protective top element 7.

Mention may be made of:
  pictograms on the state of the vehicle: oil level, temperature, door poorly closed, seatbelt not fastened;
  pictograms on whether the headlamps are turned on or not.

A plurality of signs each of which is formed by a dedicated OLED device are located along the right-hand lateral edge 15$d$ (in mounted position), the OLED devices for example being behind (against or fastened to) the protective top element 7.

Mention may be made of:
  pictograms about the door (poorly closed), the safety belt (not fastened);
  pictograms about the air conditioning, fans;

pictograms on a piece of information on the exterior environment: an indicator indicating the location of a friend in proximity to the vehicle;

an indicator indicating connectivity to a telecommunications network.

The width of the enamel strip 4 is judiciously larger in the zones of the signs above.

FIG. 1' shows a passenger compartment side front view of a second windshield comprising internal luminous signs according to the present invention.

A plurality of signs each of which is formed by a dedicated OLED device are located along the lower longitudinal edge 15*a* (in mounted position) driver side, the OLED devices for example being behind (against or fastened to) the protective top element 7.

Mention may be made of:

an anti-left-lateral-collision diagnostic that for example turns on if an overtaking vehicle and/or a vehicle in the left-hand lane is too close;

an anti-right-lateral-collision diagnostic that for example turns on if a vehicle in the right-hand lane is too close;

a lane-position diagnostic that for example turns on if the vehicle being driven is too far to the left or too far to the right in its lane.

The protective top element 7 may be L-shaped so as to extend each side of a corner, such as here over the left lateral edge 15*c* and the upper longitudinal edge 15*b*.

In the vision area zone, in proximity to the border of the top masking layer, it is possible to place a system comprising optional transparent bottom film/OLEDs 2*c* and 2*d*/transparent top protection element 7*a* (which can extend above the interior and/or exterior masking zone on the lateral and/or longitudinal edge, bent or not). The electrical power supply conductors are chosen to be made of transparent material or of more opaque material (metallic etc.) of a width that is sufficiently thin (for example less than 1 mm or 0.8 mm)—wires or tracks—so as to be (quasi) invisible. The transparent protection element 7*a* can extend above the interior and/or exterior masking zone and protect one or other of the OLED signs. The same applies for the optional bottom film, etc.

FIG. 1" shows a partial passenger compartment side front view of a third windshield comprising internal luminous signs according to the present invention.

A pictogram, for example here the hazard warning light, may be isolated from the other pictograms with an extra thickness of enamel 4 behind this pictogram. For example, this first OLED device is here mounted on face F4 with an individual protective top element 7, said element 7 as a variant being common with the others.

FIG. 1*i* is a side view that shows the steep inclination of a windshield with an internal luminous sign according to the invention of actual height H and of apparent height H' (as perceived by the driver located opposite).

For example, the angle α is about 25°.

Furthermore, FIG. 1*j* shows signs stretched in the vertical direction in order to compensate for the effect of the inclination.

Figure 2:
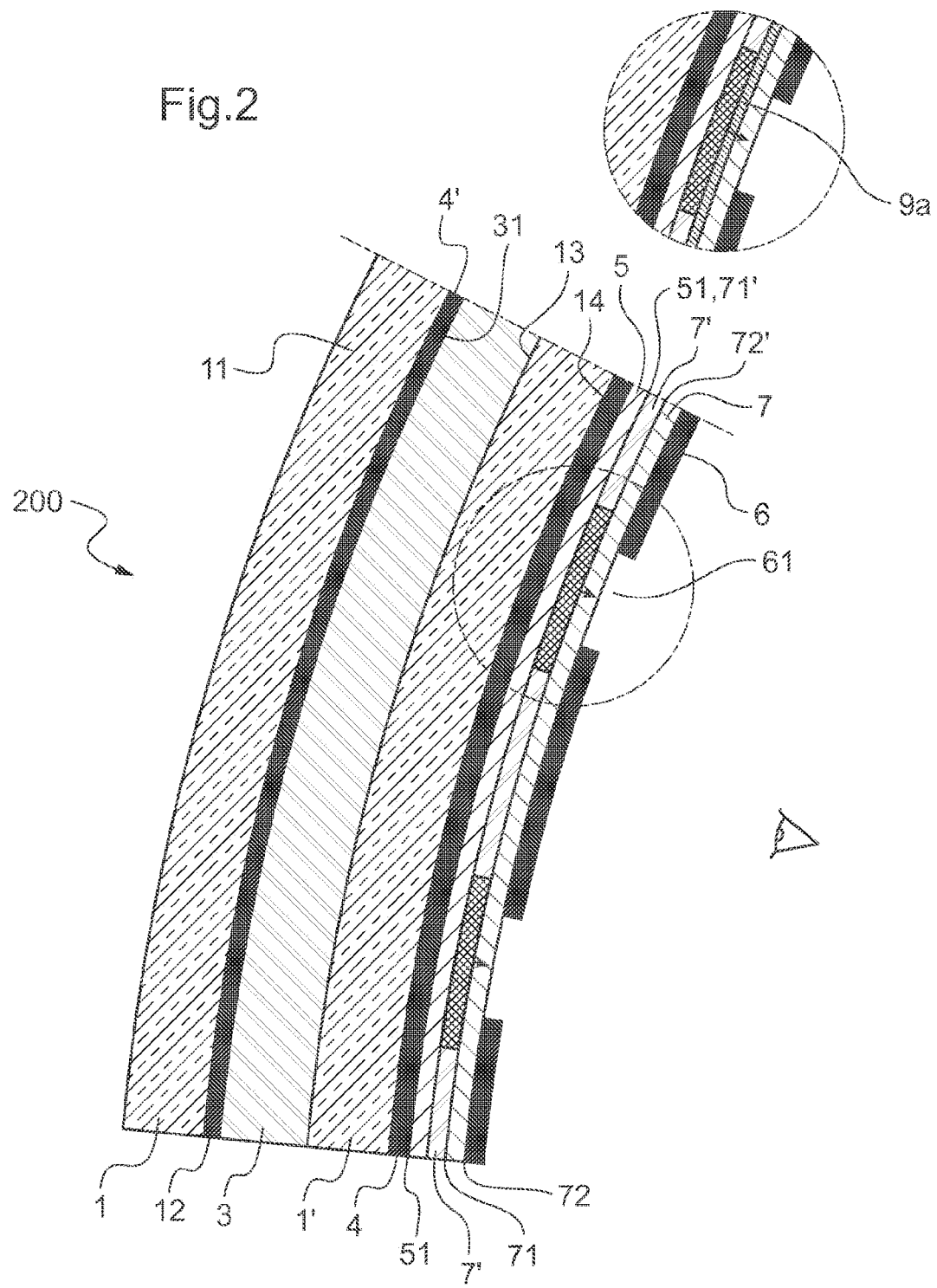
FIG. 2 shows a partial cross-sectional view of a laminated windshield comprising one or more internal luminous signs according to the present invention.

FIG. 2 shows a partial lateral cross-sectional view of a laminated windshield 200 comprising one or more internal luminous signs according to the present invention.

The laminated vehicle windshield 200 including one or more internal luminous signs, comprises:

a first curved glazing that is preferably made of mineral glass and optionally tinted, in particular grey or green, with a first main face called F1 that is intended to be exterior side of the vehicle and an opposite second main face called F2, said glazing being a thickness E1 of preferably at most 2.5 mm, and even of at most 2 mm—in particular 1.9 mm, 1.8 mm, 1.6 mm and 1.4 mm—or even of at most 1.3 mm or of at most 1 mm, this glazing for example being made of TSA glass and of 2.1 mm thickness;

a second curved (just like the first glazing) glazing that is preferably made of mineral glass, with a third main face called F3 and an opposite fourth main face F4 that is in particular intended to be interior side of the vehicle, the thickness E'1 preferably being smaller than E1, and even of at most 2 mm—in particular 1.9 mm, 1.8 mm, 1.6 mm and 1.4 mm—or even of at most 1.3 mm or of at most 1 mm, the total thickness of the glazings E1+E'1 preferably being strictly smaller than 4 mm and even than 3.7 mm, this glazing for example being made of TSA glass and of 2.1 mm thickness, said first and second glazings being connected together via the faces F2 and F3 by a lamination interlayer made of (clear or extra-clear) thermoformable and preferably thermoplastic polymeric material and even of PVB and of (total) thickness E3 of at most 2.2 mm and better still of at most 2 mm, of at most 1.5 mm or even of at most 1 mm, said interlayer being made up of 1, 2 or 3 sheets and in particular being set back from the edge face of the second glazing (by at most 5 mm or even at most 2 mm or at most 1 mm) and even set back from the edge face of the first glazing (by at most 5 mm or even at most 2 mm or at most 1 mm), said interlayer having a first bonding main face face F2 side and a second bonding main face face F3 side;

a first peripheral layer called the interior masking layer 4 made of an opaque material that extends along a border of face F3, on face F4, in particular along a border of face F4, in particular (directly) on face F4;

and/or a second peripheral layer called the exterior masking layer 4' made of opaque material on face F2, which faces the interior masking layer and extends along a border of the face F2.

The interior masking layer 4 and the exterior masking layer 4' are made of the same material and preferably of an enamel. A functional layer, such as a transparent conductive layer, may be on face S3 and serve for example as an anti-solar or heating (anti-fog, etc.) layer.

A first curved organic-light-emitting-diode device 2*a* called an OLED device is associated with face F4 on the periphery and face F4 side and here is above the zone of the interior and/or exterior masking layers 4, 4' (as a variant it is possible to have the layer 4 or the layer 4').

The first OLED device is able to emit a first emission in the visible spectrum and forms a first sign 61. Adjacently, there is a thin second curved organic-light-emitting-diode device 2*b* called an OLED device, which is of the same size as 2*a*. The second OLED device is able to emit an emission in the visible spectrum and forms a second sign 61.

The OLED devices 2*a* and 2*b* are behind (against or fastened to) a top element called the protective top element 7 that is preferably dielectric and transparent, further from the second glazing than the OLED devices, and that is a thin glass or polemic transparent curved film. The top element called the protective top element bears, on its bottom main face 71 or top main face 72, first discontinuities 61 in a layer called the top masking layer 6, 60 forming windows for the OLED signs.

The OLED devices 2*a* and 2*b* are of preferably subcentimeter-sized thickness E2 and even at most 0.5 millimeters thick and better still at most 0.35 mm thick.

The protective top element 7 is for example a (flexible) thin polymeric film, in particular one made of a PET, a polyimide, a polycarbonate, acrylic, a PEN or PEEK and then the top masking layer may be a sol-gel layer, a paint or a lacquer of the same color preferably as that of the interior and/or exterior masking layer.

The protective top element 7 is for example made of an in particular tempered glass and then the top masking layer may be a sol-gel layer, a paint, a lacquer or an enamel that in particular is identical to that or those on the windshield or at least preferably of the same color.

To fasten the protective top element 7 a double-sided adhesive 7' is used (flanking the OLEDs) with a top face 72' face 71 side and a bottom face against a protective bottom element 5 such as a (laminated) film 5, a bottom face 51 optionally being adhesively bonded to the face F4 (on the optional layer 4') and a top face 52 being on the side of the double-sided adhesive 7'. The bottom film 5 is for example a (flexible) thin polymeric film, in particular one made of a PET, a polyimide, a polycarbonate, acrylate, a PEN or PEEK.

The bottom film 5 and/or the protective element 7 may bear electrical conductors that in particular supply the OLEDs with power or that form a touch button, for example a capacitive touch button. These conductors are isolated by the dielectric double-sided adhesive.

As shown in the detailed view, when the OLED emits in the white, a color filter 9a may be added in addition thereto on the bottom face 71 or on the OLED.

Figure 3:
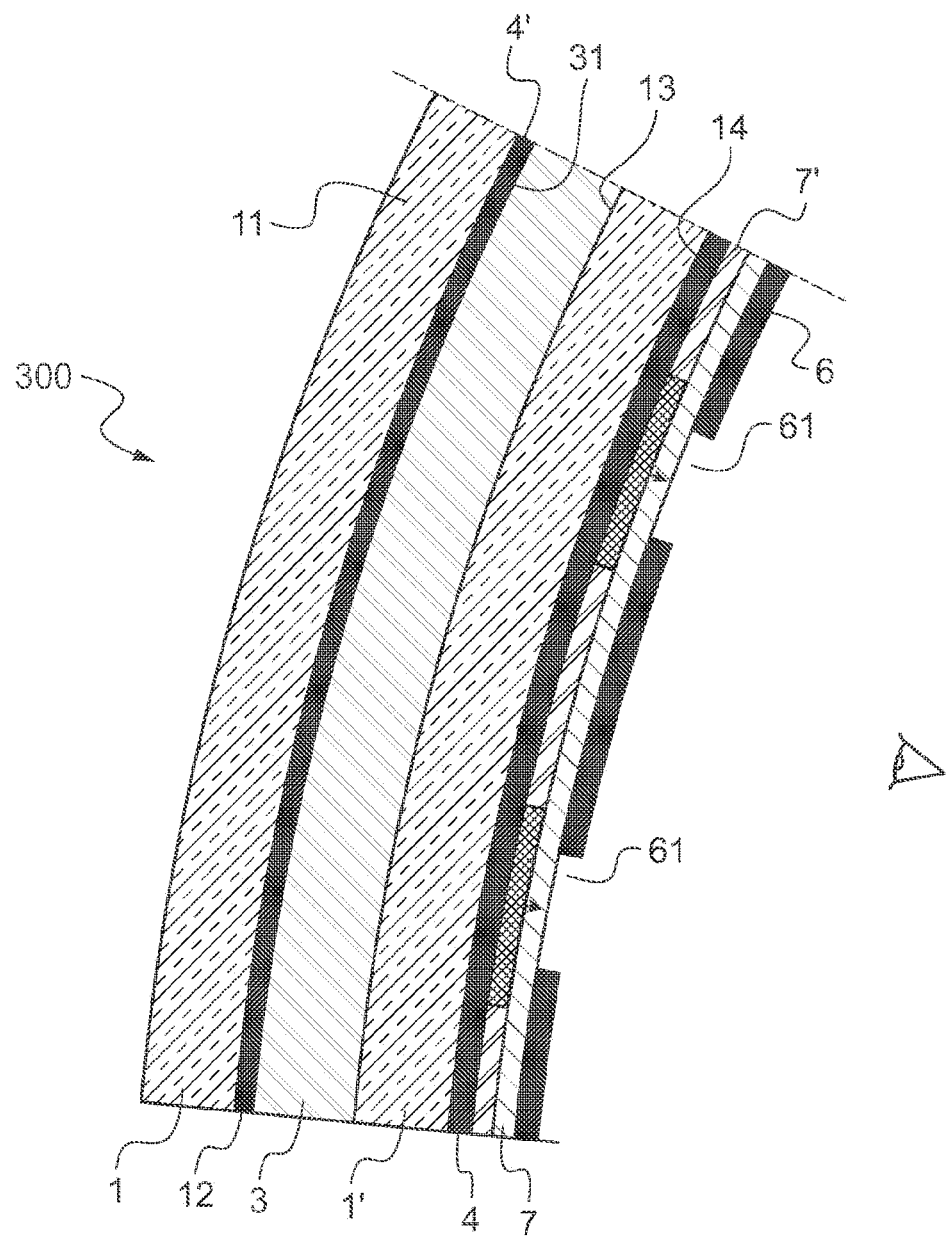
FIG. 3 shows a partial cross-sectional view of a laminated windshield comprising one or more internal luminous signs according to the present invention.

FIG. 3 shows a partial lateral cross-sectional view of a laminated windshield 300 comprising one or more internal luminous signs according to the present invention.

It differs from the windshield 200 in the absence of the bottom film. The OLEDs 2a and 2b are adhesively bonded or against the face F4 (with the optional layer 4).

Figure 4:
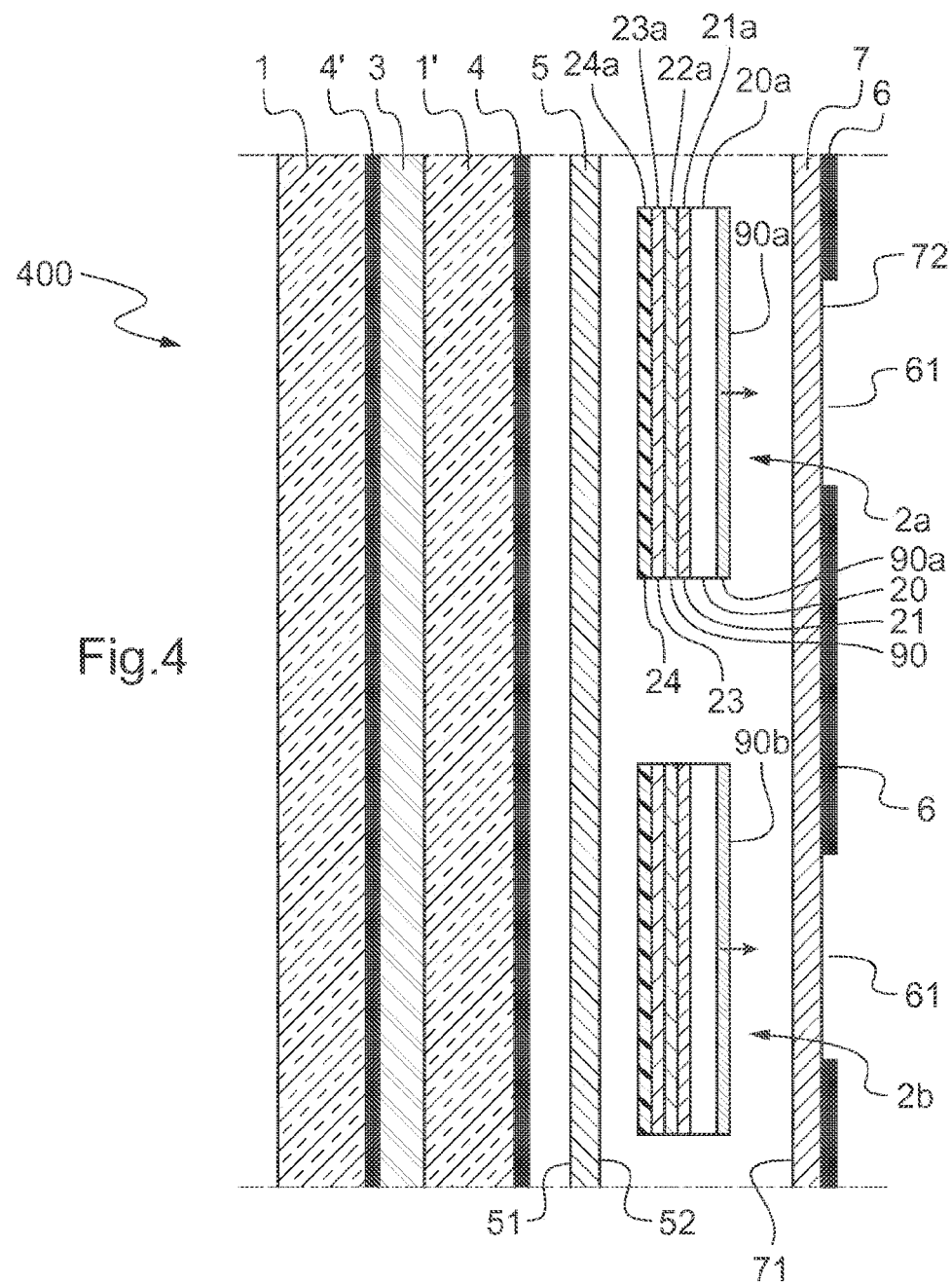
FIG. 4 shows an exploded partial longitudinal cross-sectional view of a laminated windshield comprising one or more internal luminous signs according to the present invention and FIG. 4$a$ its connection.

FIG. 4 shows an exploded partial longitudinal cross-sectional view of a laminated windshield 400 comprising one or more internal luminous signs according to the present invention (for the sake of simplicity the elements have not been drawn curved i.e. with a curvature).

The first and second LED devices 2a and 2b are chosen to be bottom-emitting devices (emission through their substrates) and each includes:

- a for example plastic (PET etc.) or (tempered) glass first curved transparent substrate 20 bearing:
- a transparent lower electrode (the closest to the substrate) 21 that is for example made of ITO or a metal (silver, etc.) grid;
- a first organic light-emitting system 22;
- a reflective electrode that is called the upper electrode (the furthest from the substrate) 23 and for example made of aluminum or silver; and
- optionally a varnish or a protective film 24, for example kapton adhesively bonded to the upper electrode and optionally extending therebeyond and with contact lands for the electrodes (on a given side 21a, 23a).

The bottom face 71 is adhesively bonded to the OLEDs by means of a double-sided adhesive 90a, 90b.

The bottom element 5 is a double-sided adhesive for adhesively bonding the assembly made up of the top element 7 and the OLEDs 2a, 2b to the face F4.

The bottom faces (24 side) of the LEDs may be against the face F4 (the layer 4) if the element 5 is cut to house the OLEDs.

Figure 4A:
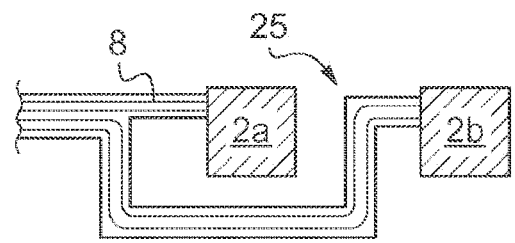

Regarding the connection, as shown in FIG. 4a a flexible printed circuit board 25 i.e. what is conventionally called a PCB (that is made of plastic and in particular has 8 tracks) may be used. It may be between the OLED devices 2a and 2b and in the protective resin. It may be the same thickness as the OLEDs.

Figure 5:
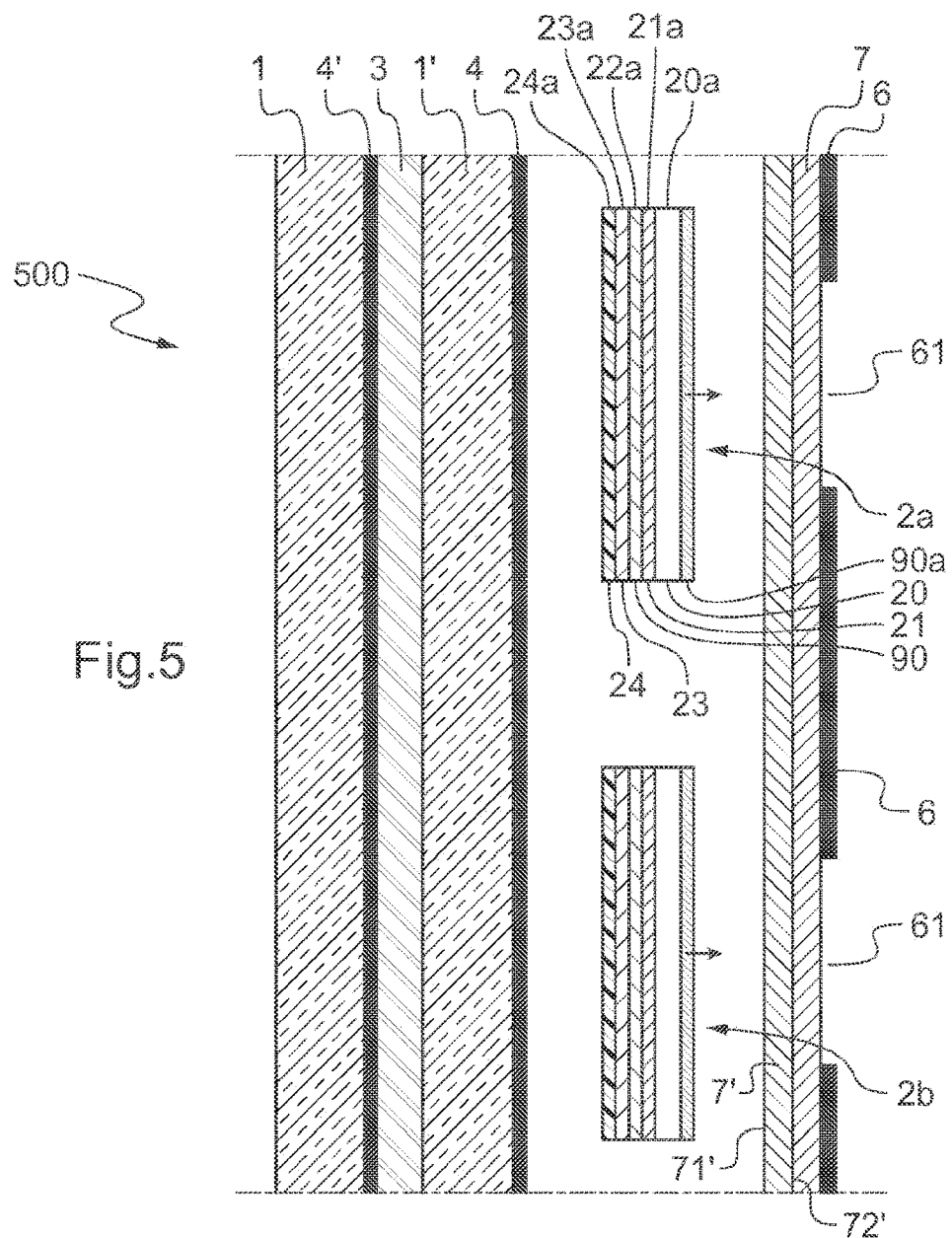
FIG. 5 shows an exploded partial lateral cross-sectional view of a laminated windshield comprising one or more internal luminous signs according to the present invention.

FIG. 5 shows an exploded partial longitudinal cross-sectional view of a laminated windshield 500 comprising one or more internal luminous signs according to the present invention (for the sake of simplicity the elements have not been drawn curved i.e. with a curvature).

The laminated windshield 500 differs from the windshield 400 in the absence of the bottom film 5. The OLEDs 2a and 2b are adhesively bonded or against the face F4 (with the optional layer 4) and a double-sided adhesive is on the bottom face 71 of the protective top element.

The connection is for example achieved via a set of wires or a flat connector between the OLED devices and extending beyond the edge face of the glazings.

Figure 6:
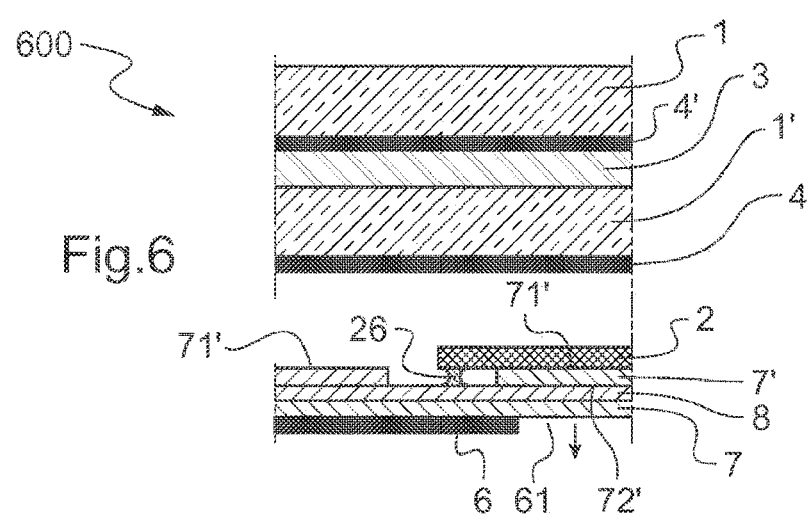
FIG. 6 shows an exploded partial lateral cross-sectional view of a laminated windshield comprising one or more internal luminous signs according to the present invention.

FIG. 6 shows an exploded partial longitudinal cross-sectional view of a laminated windshield 600 comprising one or more internal luminous signs according to the present invention (for the sake of simplicity the elements have not been drawn curved i.e. with a curvature).

The laminated windshield 600 differs from the windshield 500 in the presence of electrical conductors such as an electrically conducting (metal, TCO, etc.) layer 8 with electrically insulating zones or lines.

The OLEDs 2a and 2b are adhesively bonded by a double-sided adhesive 7' on the bottom face 71 of the protective top element. This adhesive is apertured for the electrical contacts between the OLED 2 and the layer 8, which contacts are for example formed by solder bumps 26.

Figure 7:
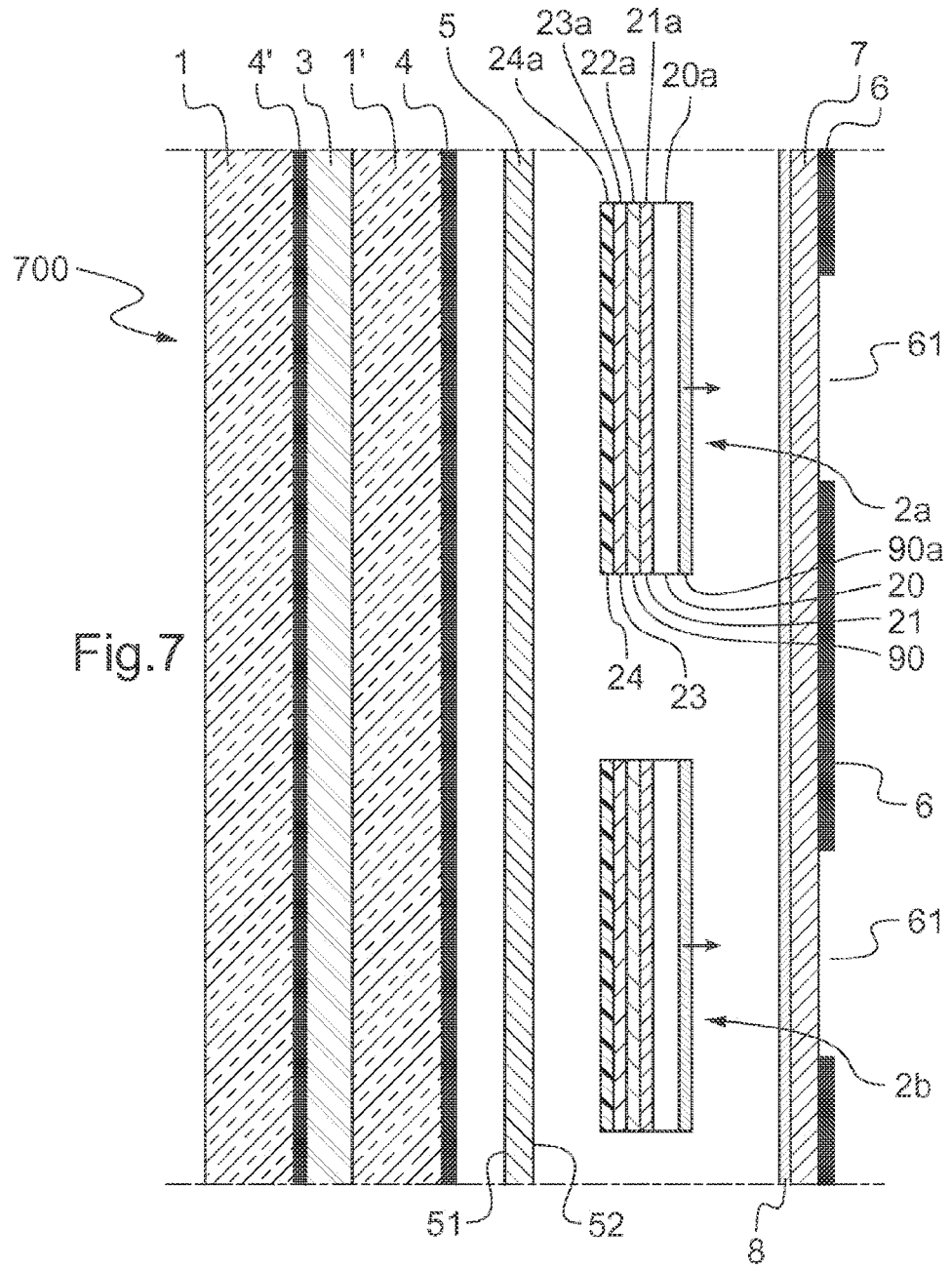
FIG. 7 shows an exploded partial longitudinal cross-sectional view of a laminated windshield comprising one or more internal luminous signs according to the present invention.

FIG. 7 shows an exploded partial longitudinal cross-sectional view of a laminated windshield 700 comprising one or more internal luminous signs according to the present invention (for the sake of simplicity the elements have not been drawn curved i.e. with a curvature).

The laminated windshield 700 differs from the windshield 600 in that the double-sided adhesive 5 has been moved top face side.

The OLEDs 2a and 2b are adhesively bonded by a double-sided adhesive 7' on the bottom face 71 of the protective top element. This adhesive is apertured for the electrical contacts between the OLED 2 and the layer 8, which contacts are for example formed by solder bumps 26.

FIG. 8a shows a front view of a common carrier 7 that is the top element or even the bottom film or even the face F4 bearing two OLED devices 2a and 2b forming luminous signs (picto etc.) and bearing conductors for distributing current to the windshield. It is a question of zones of a conductive (metal, TCO, etc.) layer 8 with four electrically insulating lines 80.

FIG. 8b shows a front view of a common carrier 7 that is the top element or even the bottom film or even the face F4 bearing two OLED devices 2a and 2b forming luminous signs (picto etc.) and bearing conductors for distributing current to the windshield. It is a question of four for example metal, such as copper, conductive tracks 81 to 84 that may be visible or (quasi)invisible.

FIG. 8c shows a front view of a common carrier 7 that is the top element or even the bottom film bearing two OLED devices 2a and 2b forming luminous signs (picto etc.) and bearing conductors for distributing current to the windshield. It is a question of four for example copper conductive tracks 81 to 84 that may be visible or invisible. The support also has a dog-legged portion jutting over the edge face 15.

The invention claimed is:

1. A laminated vehicle windshield including one or more internal luminous signs, comprising:

a first curved glazing with a first main face, which first main face is intended to be on an exterior side of the vehicle, and an opposite second main face;

a second curved glazing with a third main face and an opposite fourth main face, which fourth main face is intended to be on an interior side of the vehicle, at least one of the first and second curved glazings being made of mineral glass, said first and second curved glazings being connected together via the second and third main faces by a lamination interlayer made of a thermoformable polymeric material, said lamination interlayer including a first bonding main face toward a side of the second main face and a second bonding main face toward a side of the third main face; and a first light source for a first sign;

wherein the first light source includes a first curved organic-light-emitting-diode (OLED) device, said first curved OLED device associated with the fourth main face and on a periphery of the fourth main face side, and wherein the first curved OLED device is configured to emit a first emission in the visible spectrum and forms the first sign, and wherein the first curved OLED device is behind a protective top element, further from the second curved glazing than the first curved OLED device.

2. The laminated vehicle windshield as claimed in claim 1, further comprising a first peripheral layer forming an interior masking layer made of opaque material, which is between the second bonding face and the third main face or which is on the fourth main face, and/or a second peripheral layer forming an exterior masking layer made of opaque material, between the first bonding face and the second main face, wherein when the first curved OLED device is above the zone of the interior and/or exterior masking layer, the protective top element is a curved film bearing, on its bottom main face or top main face, a top masking layer that is made of opaque material, with a first passage discontinuity to leave the first sign visible.

3. The laminated vehicle windshield as claimed in claim 1, wherein the first curved OLED device is in the vision area, wherein electrical connections of the first curved OLED device are invisible or transparent.

4. The laminated vehicle windshield as claimed in claim 3, wherein the protective top element is a curved film that extends beyond one or more edges of the first curved OLED device, and a second OLED device is adjacent to the first curved OLED device and forms a second sign, made up of one or more symbols and/or one or more letters, which second sign is adjacent to the first sign, and is behind the protective top element, the bottom main face of the protective top element being adhesively bonded to fourth main face by a glue or a double-sided adhesive.

5. The laminated vehicle windshield as claimed in claim 1, further comprising a curved second organic-light-emitting-diode (OLED) device associated with the fourth main face, said second curved OLED device being distinct from the first curved OLED device and forming a second sign, made up of one or more symbols and/or one or more letters, which second sign is adjacent to the first sign and the first and second OLED devices are on a common carrier made of curved film, which:

is arranged top side and therefore light emission, or is a bottom film arranged bottom side and therefore the side opposite to the light emission side, on the fourth main face.

6. The laminated vehicle windshield as claimed in claim 5, wherein the protective top element via its bottom face bears electrical conductors that supply the first curved OLED device and the second curved OLED device with power or wherein the bottom film via its top face bears electrical conductors that supply the first curved OLED device and the second curved OLED device with electrical power.

7. The laminated vehicle windshield as claimed in claim 5, wherein the protective top element via its bottom face bears electrical conductors that supply the first curved OLED device and the second curved OLED device with power.

8. The laminated vehicle windshield as claimed in claim 1, wherein the protective top element is chosen from a polymeric film or a glass and/or a bottom film between the fourth main face and the first curved OLED device is chosen from a polymeric film or a glass.

9. The laminated vehicle windshield as claimed in claim 1, further comprising a second curved organic light-emitting diode (OLED) device, which is on the fourth main face, said second curved OLED device configured to illuminate a second sign made up of symbol(s) and/or letter(s), adjacent to the first sign, and wherein the first and second curved OLED devices are between:

a curved bottom element, which is therefore the side opposite the light emission side, adhesively bonded to the fourth main face and which is chosen from a double-sided adhesive and a film bearing first electrical conductors on a top face that is on the same side as the first and second curved OLED devices;

and the protective top element that is a curved film optionally bearing on its bottom face second electrical conductors.

10. The laminated vehicle windshield as claimed in claim 9, wherein the first conductors are for supplying electrical power to the first and second curved OLED devices and the second conductors form a touch button of the first curved OLED device.

11. The laminated vehicle windshield as claimed in claim 1, wherein the first curved OLED device is mounted on the fourth main face directly or via a carrier that is common to a second curved OLED device that is adjacent to the first curved OLED device and configured to illuminate a second sign made up of one or more symbols and/or one or more letters, which second sign is adjacent to the first sign, and the fourth main face is optionally coated with an interior masking layer or the common carrier bears electrical conductors that supply the first curved OLED device and the second curved OLED device with electrical power.

12. The laminated vehicle windshield as claimed in claim 11, wherein the electrical conductors of the first curved OLED device are protected by a varnish or a resin or even all thereof is coated in a protective dielectric material that is at most 0.5 mm in thickness, all thereof being adhesively bonded to the fourth main face directly or via a bottom film and to the protective top element.

13. The laminated vehicle windshield as claimed in claim 1, further comprising a color filter on the first curved OLED device, or on the top or bottom face of the protective element.

14. The laminated vehicle windshield as claimed in claim 1, wherein the first sign is inscribed in a rectangle of centimeter-sized vertical dimension or height H and such as to define an angle $\alpha$ between the windshield and a gaze axis of the driver, the first sign being characterized by a vertical apparent height H' and H is set by the formula $H=H'/\sin(\alpha)$.

15. The laminated vehicle windshield as claimed in claim 1, wherein the first sign is chosen from:

a driving aid;

a status indicator indicating an operating state of the automobile;

a piece of information on the exterior environment;

an indicator indicating connectivity to a communications network.

16. The laminated vehicle windshield as claimed in claim 1, further comprising a first peripheral layer forming an interior masking layer, said first curved OLED device being above a zone of the interior masking layer, the interior masking layer being a strip of width L0 and in the zone of the first sign of width L1>L0.

17. The laminated vehicle windshield as claimed in claim 1, wherein the first curved OLED device, which is associated with the fourth main face, includes a first substrate and emits through the first substrate and an optional second OLED device, which is associated with the fourth main face, includes a second substrate that is adjacent or identical to the first substrate, and that emits through the second substrate.

18. The laminated vehicle windshield as claimed in claim 1, wherein the first curved OLED device includes a first curved transparent substrate including in this order on the fourth main face side:

a transparent lower electrode;

a first organic light-emitting system; and a reflective upper electrode;

and wherein the windshield optionally includes a second curved OLED device that includes a second curved transparent substrate adjacent to the first curved OLED device and configured to illuminate a second sign, and including on the fourth main face side in this order:

a transparent lower electrode;

a second organic light-emitting system; and a reflective upper electrode.

19. The laminated vehicle windshield as claimed in claim 1, wherein the first curved OLED device is a bottom-emitting device.

20. The laminated vehicle windshield as claimed in claim 1, wherein the first curved glazing has a thickness $E1$ of at most 2.5 mm and the second curved glazing has a thickness $E'1$ of at most 2.2 mm.

* * * * *